United States Patent [19]

Lebon et al.

[11] Patent Number: 4,844,873

[45] Date of Patent: Jul. 4, 1989

[54] SEPARATION AND RECOVERY OF SOLIDS FROM LIQUIDS CONTAINING THEM USING THE IONIC FLOTATION PROCESS

[75] Inventors: Marc Lebon, Etampes; Michèle Prèvost, Bures sur Yvette; El A. Jdid, Vandoeuvre; Pierre Blazy, Nancy, all of France

[73] Assignee: Institut National de Recherche Chimique Applique, Paris, France

[21] Appl. No.: 893,330

[22] PCT Filed: Jun. 19, 1985

[86] PCT No.: PCT/FR85/00163

§ 371 Date: Jul. 22, 1986

§ 102(e) Date: Jul. 22, 1986

[87] PCT Pub. No.: WO86/03142

PCT Pub. Date: Jun. 5, 1986

[30] Foreign Application Priority Data

Nov. 30, 1984 [FR] France ................................ 84 18301

[51] Int. Cl.[4] .............................................. C01G 56/00

[52] U.S. Cl. ...................................... 423/12; 209/166; 209/170; 210/705; 210/712; 210/912; 423/11; 423/21.1; 423/42; 423/122; 423/140; 423/321 R

[58] Field of Search ................................ 209/164–170; 210/703–707, 712, 195.1, 221.2, 912; 423/321 R, 11, 21.1, 42, 140, 122, 12

[56] References Cited

U.S. PATENT DOCUMENTS

| | | | |
|---|---|---|---|
| 2,793,185 | 5/1957 | Albrektsson et al. | 210/703 |
| 3,117,082 | 1/1964 | Schluter | 210/221.2 |
| 3,179,252 | 4/1965 | Vrablik | 210/120 |
| 3,243,046 | 3/1966 | Kakumoto et al. | 210/221.2 |
| 3,966,598 | 6/1976 | Ettelt | 210/703 |
| 4,094,783 | 6/1978 | Jackson | 210/703 |
| 4,160,737 | 7/1979 | Pielkenrood | 210/221.2 |
| 4,263,148 | 4/1981 | Symens et al. | 210/705 |
| 4,534,862 | 8/1985 | Zlokarnik | 210/221.2 |

FOREIGN PATENT DOCUMENTS

| | | |
|---|---|---|
| 0004953 | 10/1979 | European Pat. Off. . |
| 0037513 | 10/1981 | European Pat. Off. . |
| 0059227 | 9/1982 | European Pat. Off. . |
| 0099804 | 3/1984 | European Pat. Off. . |
| 342528 | 4/1978 | Fed. Rep. of Germany . |
| 2484862 | 9/1984 | France . |
| 2557090 | 4/1986 | France . |
| WO80/00423 | 3/1880 | PCT Int'l Appl. . |
| 2072650 | 10/1981 | United Kingdom . |

*Primary Examiner*—Peter Hruskoci
*Attorney, Agent, or Firm*—Browdy & Neimark

[57] ABSTRACT

Improvement to the separation and recovery of solids from liquids containing them, and using a ionic flotation process, implementing an installation characterized in that it comprises at least a vat (1) for pretreating the solution to be treated for the insolubilization of the solid to be recovered and the formation of a suspension maintained under stirring conditions (stirrer 2), at least a flotation cell (5) supplied with said suspension, at least a device (4) provided between said vat (1) and said flotation cell (5) adapted to generate within the cell a rising non-turbulent stream intended to convey the desired solid towards the surface of said suspension while maintaining at said surface a calm area for the accumulation of said solid and at least one means for the recovery of said solid (6–7).

2 Claims, 1 Drawing Sheet

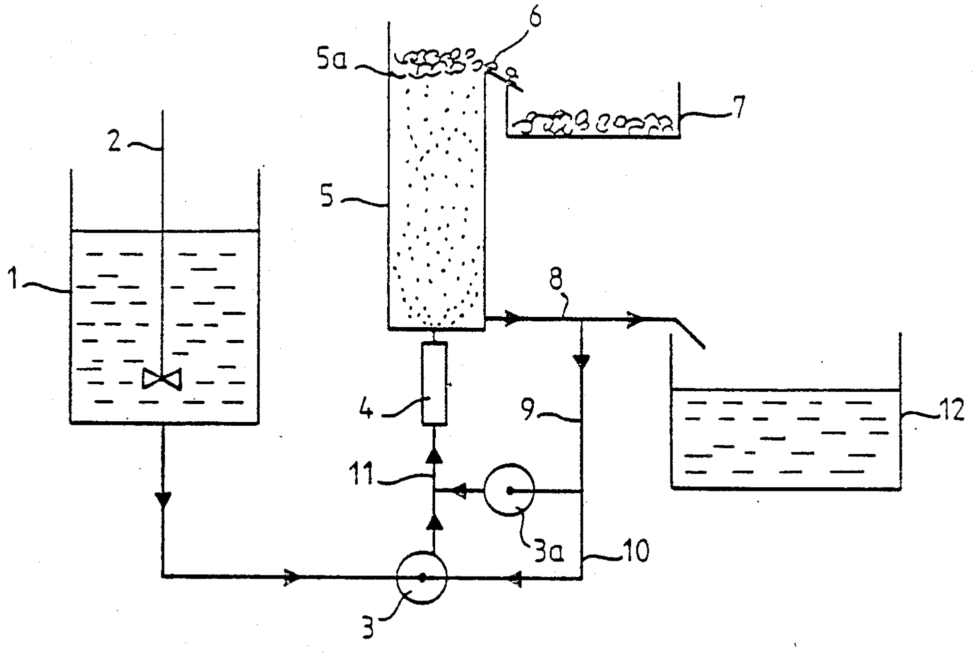
6
5a
7
2
5
1
8
4
9
12
11
3a
10
3

SEPARATION AND RECOVERY OF SOLIDS FROM LIQUIDS CONTAINING THEM USING THE IONIC FLOTATION PROCESS

The present invention concerns an improvement to the separation and recovery of solids from liquids containing them and using the ionic floatation process.

The invention also embodies the means to implement this improvement.

Ionic floatation is a known technique the purpose of which is to eliminate from a solution that contains them certain ions, in particular metallic cations. This technique consists in introducing into the solution to be processed a surfactant known as the collector, the role of which is to form into complexes and render insoluble the ion that is to be separated from within this liquid, to carry said complex in an ascending movement to the surface of said liquid and to recover it at said surface.

The processes and devices enabling a solid to be conveyed to the surface of a liquid in which it is present by means of bubble generators are known. If these known processes and devices be applied to the case of ionic floatation, in particular in media displaying density, viscosity and surface tension that differ from those of water, such as an acidic medium, in particular concentrated acidic medium, these means and devices involve a number of disadvantages:

some would be too expensive to implement and would require considerable expenditure of energy;

others would effectively lead to separation, though accompanied by carryover of a relatively large quantity of the liquid medium subjected to the process, which would require when said liquid medium is itself of commercial value, an additional operation to recover said liquid;

yet others would affect or would modify the physical properties of the solid to be separated, such as the specific dimensions rendering it conducive to good conveyance by the liquid;

others would not yield a satisfactory separation efficiency.

Mention will be made in particular, both with respect to the ionic floatation technique and the means applied to separate the ions from slightly acidic or basic diluted aqueous solutions, of the following works:

F. SEBBA—"Organic Ion Flotation"—Nature, Nov. 26, 1960, vol. 188, p. 736-737;

F. SEBBA—"Ion flotation"—Elsevier, New-York, 1962;

F. SEBBA—"Ion flotation as a technique for studying complexes in aqueous solution", 7th International Conference on Coordination Chemistry, Stockholm and Uppsala, Sweden, 1962;

F. SEBBA—DAS patent Nos. 11.75.622 and 12.28.571.

F. SEBBA—"Concentration by ion flotation"—Nature, 1959, vol. 184, supplement No. 14, p. 1062–1063.

The works concerning:

the extraction from uranium of a diluted sulphuric aqueous solution resulting from the lixiviation of impoverished minerals, by floatation of the uranylsulphate anion associated to a collector (fatty acid amino):

R. RABRENOVIC—Rudy 18, p. 138 (1970);

K. SHAKIR—J. of Appl. Chem. Biotechn. 23 pp 33914 347 (1973).

the elimination of cadmium from the residual waters of mineral exploitation by floatation by an alkylxanthate, and recovery of elements such as $Au^{+}$, $Ag^{+}$ and $Hg^{2+}$ present in trace quantities:

T. TAKAHASHI, I. MATSHOKA and J. SHIMOIIZAKA Technology Reports, Tohoku Univ. vol. 36, No. 2 (1971);

the elimination of cadmium from diluted aqueous nitric solutions, by means of anionic or cationic surfactants:

K. KOBAYASHI—Bull. of the Chem. Soc. of Japan, vol. 48 (6), p. 1745–1749 (1975);

the selective floatation of complex anions, such as $Zn(CN)^{2-}{}_4$ $Cd(CN)^{2-}{}_4$, from aqueous solutions with very low contents, by means of a quaternary ammonium salt:

T. GENDOLLA and W.A. CHAREWICZ—Separation Science and Technology, 14 (7) p. 65914 662 (1979).

For concentrated acidic media, in particular the more viscous ones, mention will be made of the case of separation from uranium of thorium in an 8N concentrated hydrochloric acid medium by means of a cationic surfactant, benzethonium chloride, which has been described by:

C. T. IACOBELLI, S. TERENZI and M. PALMERA - I and EC Process Design and Development, vol. 6, No. 2, April 1967, p. 162–165.

More recently, the problem of the extraction of elements by ionic floatation has been tackled for concentrated phosphoric acid media and more particular for phosphoric acid concentrated by the wet industrial method. This work is covered by French Pat. No. 2.530.161, which describes an "ionic floatation process applied to hyperacid media", intended for the recovery of rare metals (U, Zr, Y) or the separation of transition metals or other metals such as Ni, Cu, Co, Cd, As, the rare earths, etc. . .

For such media, the usual floatation techniques are not effective.

In addition, as regards the means and devices for forming bubbles, the function of which is to convey a solid within a liquid phase containing it, mention may be made in particular of French Pat. Nos. 2.338.071 and 2.313.127 and its certificate of addendum 2.354.820, as also the techniques making use of an expansion of a fluid under pressure within the liquid phase, and the techniques of formation of bubbles by means of turbines.

Now, it has appeared to the patent applicant that amongst the different processes mentioned above, none transpires to be fully satisfactory on industrial scale, particularly in the case of media featuring density, viscosity and surface tension that differ from those of water.

Furthermore, these different means do not enable the solid to be collected satisfactorily either because they provoke the conveyance of a non-negligible quantity of liquid owing to considerable turbulence phenomena, or because they are too expensive owing to the many operations or stages that must be provided to achieve the desired result.

It is the intention of the present invention to obviate these disadvantages and to provide a simple and economic process and simple and economic means for:

good separation of the solid within the liquid phase without affecting the physical properties of this solid;

a high separation efficiency;

recovery of the solid that is practically free from liquid and encloses only a small quantity of this liquid.

It has in fact now been found in unexpected fashion that one obtains at the surface of a volume of the liquid to be processed and in a tranquil zone an accumulation of the solid desired that is practically free from the initial liquid phase by subjecting a fraction of the liquid to be processed containing the solid to be recovered to a process consisting in allowing this fraction to enter into a suitably adapted device to lower its pressure, in placing the resulting flux in contact with a gas admitted into this flux at very high speed and at a low angle of incidents, in bringing about confluence of the two fluids under conditions of expansion in order to form a fine emulsion and in taking up said emulsion by raising the pressure whilst maintaining the resultant pressure at a level lower than that corresponding to the initial pressure of the liquid admitted, and in injecting said emulsion into such volume of the liquid to be processed. The term "liquid to be processed" is meant to signify all suspension of the "collector-ion" precipitate in the liquid phase.

By proceeding in this way, one observes also that the floatation aptitude of the solid is not altered by modification, for example, of its particle dimension, nor during its passage in the device, nor by untimely turbulence within the liquid mass.

In addition, it has now been found that the system applies particularly appropriately when the liquid to be processed is a concentrated solution of a mineral acid such as for instance phosphoric acid; the efficiency expressed as a percentage of the quantity of solid separated in a single operation transpires to be at least 90% in the case of the phosphoric medium.

In accordance with other characteristics, the invention provides a recycling circuit in the system permitting total recovery of the solid desired.

Other characteristics and advantages of the invention will emerge more clearly from the description that follows, given in relation to the drawing appended.

BRIEF DESCRIPTION OF THE DRAWING

The drawing illustrates diagrammatically the implementation of the process according to the invention.

Referring to this drawing, a vat 1 is provided for pretreating the solution to be treated, this pretreatment consisting in introducing into said vat a surfactant (collector) so as to form a suspension, maintaining this medium under stirring conditions thanks to a stirrer 2 of known type. A floatation cell 5 is supplied with this suspension by any appropriate means. A nonturbulent rising stream the purpose of which is to convey the solid to the suspension surface is then made to pass through this cell, this current being obtained as follows: through a pump 3, the medium from vat 1 is introduced into a device 4 of the type covered for example by French Pat. No. 2.484.862 and comprising from upstream to downstream a convergent conduit to supply said medium, a gas injection stage implemented so that this gas enters at high speed at a relatively low angle of incidence; this injection stage is immediately followed by an expansion stage formed by a chamber the walls of which are non-convergent and lead to a distinctly divergent zone in communication where necessary with a recovery and/or gas recycling chamber. In the figure, device 4 is represented situated at the base of cell 5. It is possible equally advantageously to situate it above said cell. At the outlet from this device a population is obtained of stable, fine, numerous bubbles capable of conveying this solid present in cell 5 to the surface 5*a* of the liquid phase. This solid collects on this surface in a condition practically exempt from the liquid conveyed with it; it is recovered by any appropriate means at 6 and sent to storage vat 7.

Advantageously, in order to completely purify the liquid contained in floatation cell 5 from its solid contents, via conduit 8, said liquid medium is sent into device 4 by the circuit designated by conduits 9-10-11, if necessary by means of a pump 3*a*.

When the solution is completely purified, the liquid medium is recovered in recovery vat 12.

The process and device in accordance with the invention are particularly interesting for the recovery of elements such as uranium, zirconium, cadmium, arsenic, the rare earths, etc., contained in wet method phosphoric acid with minimum carryover of said acid.

Likewise, the process and device in accordance with the invention can be applied to a floatation cell of the type described in aforementioned French Pat. No. 2.354.820. Such a cell in which the original gas ejector is replaced by a device in accordance with the invention can then operate under conditions that are distinctly different and more economical than those for which it is designed.

The following examples will illustrate more clearly the scope and interest of the invention:

EXAMPLE 1

Elimination of cadmium from phosphoric acid by ionic floatation by means of a turbine cell.

The test is performed on 2 litres of industrial wet method phosphoric acid containing 75 mg/l of cadmium. The collector used to precipitate the cadmium is a commercial sodium dithiophosphatediethyl which is introduced into the acid at a ratio $$R = \frac{\text{collector concentration}}{\text{metal concentration}}$$

of 4; the purification ratio of the acid is better than 99% (residual cadmium 0.4 mg/l).

The collector-cation precipitate thus obtained is separated from the acid in a laboratory floatation cell equipped with a rotor and a stator mounted in a squirrel cage. This cell enables the precipitate to be floated, though large amounts of solution are carried over in the foams (over 30%).

EXAMPLE 2

Elimination of cadmium from phosphoric acid by ionic floatation in accordance with the invention About 40 litres of technical phosphoric acid at a concentration of 6 mol/l (32% $P_2O_5$) are laden with about 30 mg/l of cadmium. The cadmium is precipitated as described in Example 1 (R=4).

The separation by floatation of the collector-cation precipitate takes place in accordance with the invention with cylindrical glass cells (5) with a capacity of 7 litres (A) or 27 litres (B) (O=9.5 and 17 cm). The operating conditions of device (4) are as follows:

liquid flow 450 l/h,
air flow (intake) 100–110 l/h,
exit speed from device (4) 1.8 m/s.

The results are entered in Table 1 and show that the efficiency of the device for floatation of the precipitate is excellent, over 90% of the solid being gathered together at the surface of the acid after one pass. Recycling of the acid (circuit 9-10-11) enables practically all the precipitate (greater than or equal to 99%) to be eliminated from the acid, in 5 minutes.

The percentage of cadmium eliminated from the acid by implementation of the ionic floatation method is thus greater than 90% for one pass and 98–99% after 5 minutes of recycling.

EXAMPLE 3

Elimination of uranium from phosphoric acid by ionic floatation in accordance with the invention.

The collector used for the uranium is an appropriate diphosphonic dialkyl compound specific to the $U^{+4}$ ion.

The procedure applied for precipitation is as in Example 1, carrying out a preliminary reduction of the uranium (before introducing the collector into the acid).

The conditions of floatation of the precipitate are the same as in Example 2, with a ratio R of 4.2.

The efficiency of the device for floatation of the precipitate is also excellent, in the range of 90% after one pass and 98% after recycling the acid solution for 5 minutes.

The uranium ratio eliminated by this implementation of the process is thus superior to 85% after one pass and equal to 95% after 5 minutes recycling.

EXAMPLE 4

Purification by ionic floatation of an industrial phosphoric acid: elimination of cadmium or uranium.

The acid treated is an industrial wet method phosphoric acid with 30% of $P_2O_5$ and containing about 40 mg/l of cadmium and 115 mg/l of uranium.

The collectors and the conditions of precipitation of the cadmium or uranium are those described in Examples 2 and 3 (R=4 for the cadmium and 3.5 for the uranium).

The floatation equipment used (C) is a commercial pilot equipment (of the WEMCO depurator type) with four cells in line, each with a capacity of about 30 litres; the device (4) of the figure appended is then positioned vertically above the liquid phase laden with solid that circulates in the cell, with the outlet from the device situated beneath the surface of the liquid; the tests were conducted with only two of the cells. These two cells were equipped with the device in accordance with the invention, taking the place of the original ejector.

The floatation conditions are as follows at the device (4):

liquid phase flow 530 to 690 l/h, air flow (intake) 175 to 210 l/h, supply pressure 0.7 to 1.5 bar.

The results are indicated in Table 1. It can be seen that the efficiency of the device for separation of the collector-cation precipitate by floatation is confirmed, the floatation efficiency with two cells being equal to 91% for cadmium and 98% for uranium. For cadmium, the percentage of metal eliminated by the use of this process is close to 90%. The lower results (74% of metal eliminated) obtained for uranium is the result of the poor precipitation efficiency for this test, caused by incomplete reduction.

On this pilot cell equipped with two devices in accordance with the invention, the carryovers of acid in the floated precipitate are low, in the range of 5%.

Naturally, the present invention has been described only for illustrative and in no way limitatory purposes and any modification, in particular with respect to equivalences, can be made without leaving the framework of the invention.

TABLE 1

| Cell | $H_3PO_4$ | Initial mg/l Cd | Initial mg/l U | Residual metal* mg/l | Precipitation effic. % | Solid before flot$^n$ mg/l | Solid after flot$^n$ mg/l 1 pass | Solid after flot$^n$ mg/l 5 mn recyc. | Floatation efficiency 1 pass % | Floatation efficiency 5 mn recyc. | % metal eliminated by ionic flot$^n$ 1 pass | % metal eliminated by ionic flot$^n$ 5 mn recyc. |
|---|---|---|---|---|---|---|---|---|---|---|---|---|
| A | technical | 58 | | 0.4 | 99.3 | 275 | 24 | 3 | 91 | 99 | 90.7 | 98.3 |
| B | " | 57 | | 0.2 | 99.6 | 270 | 19 | <1 | 93 | >99 | 92.6 | >99 |
| B | " | | 90 | 3.2 | 96.4 | 870 | 90 | 13 | 90 | 98.5 | 86.4 | 95 |
| C | industrial | 40 | | <1 | >97.5 | 190 | 17 | | 91 | | >88.5 | |
| C | " | | 118 | 29 | 75.4 | 890 | 16 | | 98 | | 74 | |

*Metal not precipitated by collector.

We claim:

1. In an ionic flotation process, for a concentrated phosphoric acid medium containing a metal cation to be separated, said metal cation being selected from the group consisting of uranium, zirconium, yttrium, nickel, copper, cobalt, cadmium and the rare earths, and a collector for precipitation of said metal cation, in which process an upward stream of gas bubbles is created in said medium containing the metal cation to separate said metal cation and said collector as a solid product, said stream carrying said solid product to the upper surface of said medium and in which said solid product is recovered, the improvement comprising, creating said upward stream by flowing a part of said medium in a means reducing its pressure and by contacting said medium with a gas stream admitted under low incidence and high speed and allowing a sudden expansion of the liquid-gas mixture, thus creating a fine emulsion of gas-liquid and said solid product, raising the resulting pressure of said emulsion whilst maintaining it at a level below that corresponding to the initial pressure of the medium introduced, injecting said emulsion into a volume of the same medium to be treated and recovering said solid product at the surface of said volume in a tranquil zone, and, beneath the surface of said volume, a remaining part of the medium free of said solid product.

2. Improvement in accordance with claim 1 wherein said remaining part is recycled for total recovery of the solid product.

* * * * *